No. 661,421. Patented Nov. 6, 1900.
M. PESCHMANN.
HOLLOW GLASS LETTER.
(Application filed Sept. 29, 1899.)
(No Model.)
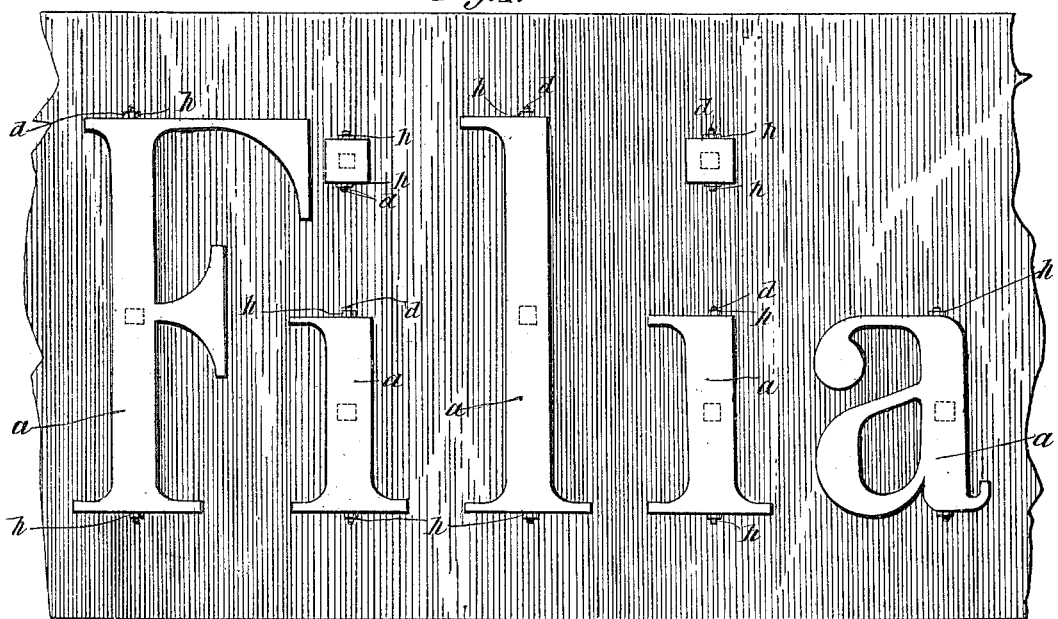
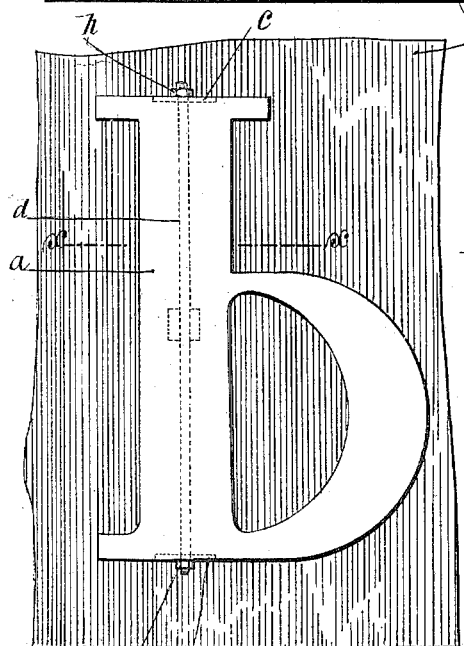
Witnesses
Inventor
Max Peschmann
Attorney

UNITED STATES PATENT OFFICE.

MAX PESCHMANN, OF WALDENBURG, GERMANY.

HOLLOW GLASS LETTER.

SPECIFICATION forming part of Letters Patent No. 661,421, dated November 6, 1900.

Application filed September 29, 1899. Serial No. 732,125. (No model.)

*To all whom it may concern:*

Be it known that I, MAX PESCHMANN, a subject of the German Emperor, and a resident of Waldenburg, Germany, have invented certain new and useful Improvements in Hollow Glass Letters, of which the following is a specification.

The object of my present invention is to provide hollow glass letters adapted to receive phosphorescent or self-lighting substances and which are provided with a suitable back adapted to be suitably secured into any desired support, such as a sign-board, show-glass, &c.

In the accompanying drawings, forming a part of this specification, I have illustrated the manner of carrying out the invention, such as will enable others skilled in the art to make and use the same.

Figure 1 shows a portion of a sign-board bearing the word "Filia" composed of letters constructed in accordance with my invention. Fig. 2 shows an enlarged front elevation of the letter "b." Fig. 3 is a cross-section on line $x\ x$ of Fig. 2.

Like letters refer to like parts throughout all the figures.

$a$ in the drawings represents the body of hollow letters made of glass, said letters being closed on three sides in cross-section, the fourth side or back of each letter being formed of a metal plate $b$, the upper and lower ends of which are turned at right angles with the body thereof to form lugs $c$, through which passes a threaded rod $d$, extending through the hollow letter. The inner hollow space is filled up with any suitable phosphorescent substances $e$, which thus constitute an effective means for advertising purposes without any other supply of light.

The back of each letter is provided with a lug $f$, whereby the same may be easily secured into the sign-board $g$, and the threaded rod $d$ is held in place by means of small nuts $h$, as seen in the drawings. However, it is evident that the letters may be secured otherwise in place without departing from the scope or sacrificing any of the advantages of the invention.

Having fully described my invention, what I claim, and desire to secure by Letters Patent, is—

In the devices of the class set forth, the combination with a hollow glass body forming a letter and open at the back, of a metal plate shaped correspondingly to said glass body, an upper and a lower forwardly-projecting end or lug on said metal plate and turned over the corresponding edges of the glass body, a vertical rod extending through said projecting ends or lugs and through the glass body, and having its ends provided with screw-threads, nuts screwed on said threaded ends, and a lug $f$ on the back of said metal plate, substantially as and for the purpose set forth.

In witness whereof I have hereunto set my hand this 11th day of September, 1899.

MAX PESCHMANN.

Witnesses:
 HERMANN BARTSCH,
 ALBERT SCHENK.